US008316137B2

(12) United States Patent
Tremaine et al.

(10) Patent No.: US 8,316,137 B2
(45) Date of Patent: Nov. 20, 2012

(54) METHOD AND APPARATUS FOR ENSURING IPV6 UNIQUENESS IN A MOBILE SUBNETTED ENVIRONMENT

(75) Inventors: Michael C. Tremaine, San Diego, CA (US); Irfan Anwar Khan, Brooklyn, NY (US); Uppinder Singh Babbar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 12/490,179

(22) Filed: Jun. 23, 2009

(65) Prior Publication Data

US 2010/0023617 A1 Jan. 28, 2010

Related U.S. Application Data

(60) Provisional application No. 61/075,127, filed on Jun. 24, 2008.

(51) Int. Cl.
*G06F 15/16* (2006.01)

(52) U.S. Cl. ........................................ 709/227; 709/249

(58) Field of Classification Search ................... 709/249, 709/250, 227; 370/331, 401
See application file for complete search history.

(56) References Cited

U.S. PATENT DOCUMENTS

| 6,574,721 | B1 | 6/2003 | Christenson et al. |
| 2003/0026230 | A1* | 2/2003 | Ibanez et al. ................. 370/338 |
| 2004/0047340 | A1 | 3/2004 | Ruckstuhl et al. |
| 2005/0271032 | A1 | 12/2005 | Yun et al. |
| 2006/0212543 | A1* | 9/2006 | O'Farrell et al. ............. 709/219 |
| 2007/0268919 | A1* | 11/2007 | Sarikaya et al. ............. 370/401 |
| 2010/0031371 | A1 | 2/2010 | Adams et al. |
| 2010/0316019 | A1* | 12/2010 | Liu et al. ....................... 370/331 |

FOREIGN PATENT DOCUMENTS

EP 1838065 A1 9/2007

OTHER PUBLICATIONS

Cheshire Apple Computer B ABOBA Microsoft Corporation E Guttman Sun Microsystems S: "Dynamic Configuration of IPv4 Link-Local Addresses; rfc3927.txt" IETF Standard, Internet Engineering Task Force, IETF, CH, May 1, 2005, XP015054862 ISSN: 0000.
Dave Thaler Christian Huitema Microsoft: "Multi-link Subnet Support in IPv6 <draft-ietf-ipv6-multilink-subnets- OO.txt>; draft-ietf-ipv6-nriultilink-subnets-00.txt" IETF Standard-Working-Draft, Internet Engineering Task Force, IETF, CH, vol. ipv6, Jun. 29, 2002, XP015002367 ISSN: 0000-0004.
Gundavelli (Editor) K Leung Cisco V Devarapalli Wichorus K. Chowdhury Starent Networks B Patil Nokia Siemens Networks S: "Proxy Mobile IPv6; draft-ietf-netlmm-proxymip6-18.txt" IETF Standard-Working-Draft, Internet Engineering Task Force, IETF, CH, vol. netlmm, No. 18, May 30, 2008, XP015056173 ISSN: 0000-0004 p. 9-p. 13; figures 1,2 p. 44-p. 48.

(Continued)

*Primary Examiner* — Frantz Jean
(74) *Attorney, Agent, or Firm* — Darren M. Simon (57) ABSTRACT

A method and apparatus for ensuring network address uniqueness is described herein. An address manager determines whether any link-local addresses associated with peripheral devices connected to a mobile device would conflict with a network assigned global address. The address manager negotiates with the network to avoid conflicts.

32 Claims, 6 Drawing Sheets

OTHER PUBLICATIONS

International Search Report and Written Opinion—PCT/US2009/048516, International Search Authority—European Patent Office—Oct. 23, 2009.

Sarikaya F Xia Huawei USA B: "Proxy Mobile IPv6 Inter-Technology Handover Issue; draft-sarikaya-netlmm-itho-OO.txt" Proxy Mobile IPV6 Inter-Technology Handover Issue; Draft-Sarikaya-NETLMM-ITHO-00.Txt, Internet Engineering Task Force, IETF; Standardworkingdraft, Internet Society (ISOC) 4, Rue Des Falaises CH—1205 Geneva, Switzerland, Jun. 3, 2008, XP015059860 the whole document.

Sun Microsystems: "IPv6 Administration Guide" Internet Article, [Online] Apr. 2003, pp. 1-112, XP002547986 Retrieved from the Internet: URL:http://dlc.sun.com/pdf/817-0573/817-05 73.pdf> [retrieved on Sep. 23, 2009 chapter 1.

Thaler M Talwar Microsoft C Patel All Play D et al: "Neighbor Discovery Proxies (ND Proxy); rfc4389.txt" IETF Standard, Internet Engineering Task Force, IETF, Ch, Apr. 1, 2006, XP015054955 ISSN: 0000-0003 chapters 1, 3-5 (incl . subchapters).

Thomson Cisco T Narten IBM T Jinmei Toshiba S: "IPv6 Stateless Address Autoconfiguration; rfc4862.txt" IETF Standard, Internet Engineering Task Force, IETF, Ch, Sep. 1, 2007, XP015052408 ISSN: 0000-0003.

Yong-Geun Hong Yong-Jin Kim Etri Min-Tae Hwang: "Autoconfiguration of IPv4 Link-Local Addresses in Multilink Networks; draft-hong-zeroconf-multilink-ipv4-00.txt" IETF Standard-Working-Draft, Internet Engineering Task Force, IETF, CH, Nov. 1, 2001, XP015014537 ISSN: 0000-0004 abstract chapters 1-3 (incl . subchapters).

* cited by examiner

FIG. 5

METHOD AND APPARATUS FOR ENSURING IPV6 UNIQUENESS IN A MOBILE SUBNETTED ENVIRONMENT

CLAIM OF PRIORITY UNDER 35 U.S.C. §119

The present Application for Patent claims priority to Provisional Application No. 61/075,127 entitled "Method and Apparatus for Ensuring IPv6 Uniqueness in a Mobile Subnetted Environment" filed Jun. 24, 2008, and assigned to the assignee hereof and hereby expressly incorporated by reference herein.

REFERENCE TO CO-PENDING APPLICATIONS FOR PATENT

The present Application for Patent is related to the following co-pending U.S. Patent Applications:

"Method and Apparatus for Intertechnology IPv6 Address Configuration" having Ser. No. 12/490,173, filed concurrently herewith, assigned to the assignee hereof, and expressly incorporated by reference herein.

BACKGROUND

1. Field

This application relates generally to communication, and more specifically to ensuring IP address uniqueness when transitioning active link-local IPv6 addresses to globally-addressable IPv6 addresses.

2. Background

In an Internet Protocol (IP) network, a host communicates with another host via a router. In IP terminology, a "node" is a device that implements IP, a "router" is a node that forwards IP packets not explicitly addressed to itself, and a "host" is a node that is not a router. As used herein, "IP" generically refers to all versions of the Internet Protocol. A host may have one or multiple interfaces to a link. In IP terminology, a "link" is a communication facility or medium over which nodes can communicate at a link layer (which is the layer immediately below IP), and an "interface" is a node's attachment to a link. An interface may be viewed as a network communication port. Each interface is associated with one or more IP addresses that uniquely identify that interface.

Internet Protocol Version 6 (IPv6) is a version of Internet Protocol that is slated to replace the widely used Internet Protocol Version 4 (IPv4). IPv6 resolves some of the key limitations of IPv4. For example, IPv4 utilizes a 32-bit address that was originally thought to provide an ample number of addresses to uniquely identify machines connected to the Internet. However, the explosive growth of the Internet has created a real risk of running out of IPv4 addresses. IPv6 ameliorates this concern by utilizing a 128-bit address.

IPv6 also provides other improvements over IPv4. For example, IPv6 supports "stateless address auto configuration", which is a process whereby a host can automatically configure its own IPv6 address(es). Stateless address configuration can avoid the need to manually configure each host before connection to a network, eliminate the need for a dedicated server to administer and assign addresses to hosts on the network, and facilitate renumbering of addresses for hosts on the network.

Stateless address auto configuration in IPv6 allows for nodes to generate multiple addresses, such as "privacy addresses," as defined in RFC 3041. The two primary types of addresses are called link-local and global addresses. Link-local addresses can be used only to communicate over the link to the router to which the device is attached and consist of a randomly generated Interface ID (IID) and a prefix of 0xFE80. The link-local addresses may be used to communicate to all nodes directly connected to the link. Global IPv6 addresses are globally routable addresses which can be used to communicate anywhere on the internet and are formed by generating a random IID and associating it with the network prefix of the current access router.

When a device is connected to a broadcast network it is necessary to validate that there is no other node using a newly generated IID. This procedure is called Duplicate Address Detection (DAD). It is possible that multiple peripheral devices could establish a local connection with a mobile before any external connection to the global internet is formed. In this way those peripheral devices could communicate with each other, and the mobile, without the mobile establishing an outbound internet connection, essentially turning the mobile into a router. However, potential address conflicts can arise when an external connection is made to the global internet. It would be desirable to have a method for preventing these scenarios and avoiding local service interruption due to duplicate address conflicts.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to some aspects, a method for ensuring network address uniqueness comprises receiving, at a mobile device, connections from a plurality of peripheral devices, each of said plurality of peripheral devices having associated therewith a link-local address for communicating with the mobile device and the other locally connected peripheral devices; and determining, by the mobile device, whether an address conflict is present among the link-local addresses.

According to some aspects, at least one processor configured to ensure IP address uniqueness in a wireless network comprises a first module for receiving, at a mobile device, connections from a plurality of peripheral devices, each of said plurality of peripheral devices having associated therewith a link-local address for communicating with the mobile device and the other locally connected peripheral devices; and a second module for determining, by the mobile device, whether an address conflict is present among link-local addresses.

According to some aspects, a computer program product comprising a computer readable medium comprises a first set of codes for causing a computer to receive connections from a plurality of peripheral devices, each of said plurality of peripheral devices having associated therewith a link-local address for communicating with the mobile device and the other locally connected peripheral devices; and a second set of codes for causing the computer to determine whether an address conflict is present among the link-local addresses.

According to some aspects, an apparatus comprises means for receiving connections from a plurality of peripheral devices, each of said plurality of peripheral devices having associated therewith a link-local address for communicating with the mobile device and the other locally connected peripheral devices; means for determining whether an address conflict is present among the link-local addresses.

According to some aspects, an apparatus comprises at least one first interface for interfacing with at least one external network; a plurality of second interfaces having connected thereto a plurality of peripheral devices, each peripheral device having associated therewith a link-local address for communicating with the apparatus and the other locally connected peripheral devices; and a conflict determiner for determining whether an address conflict is present among link-local addresses.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
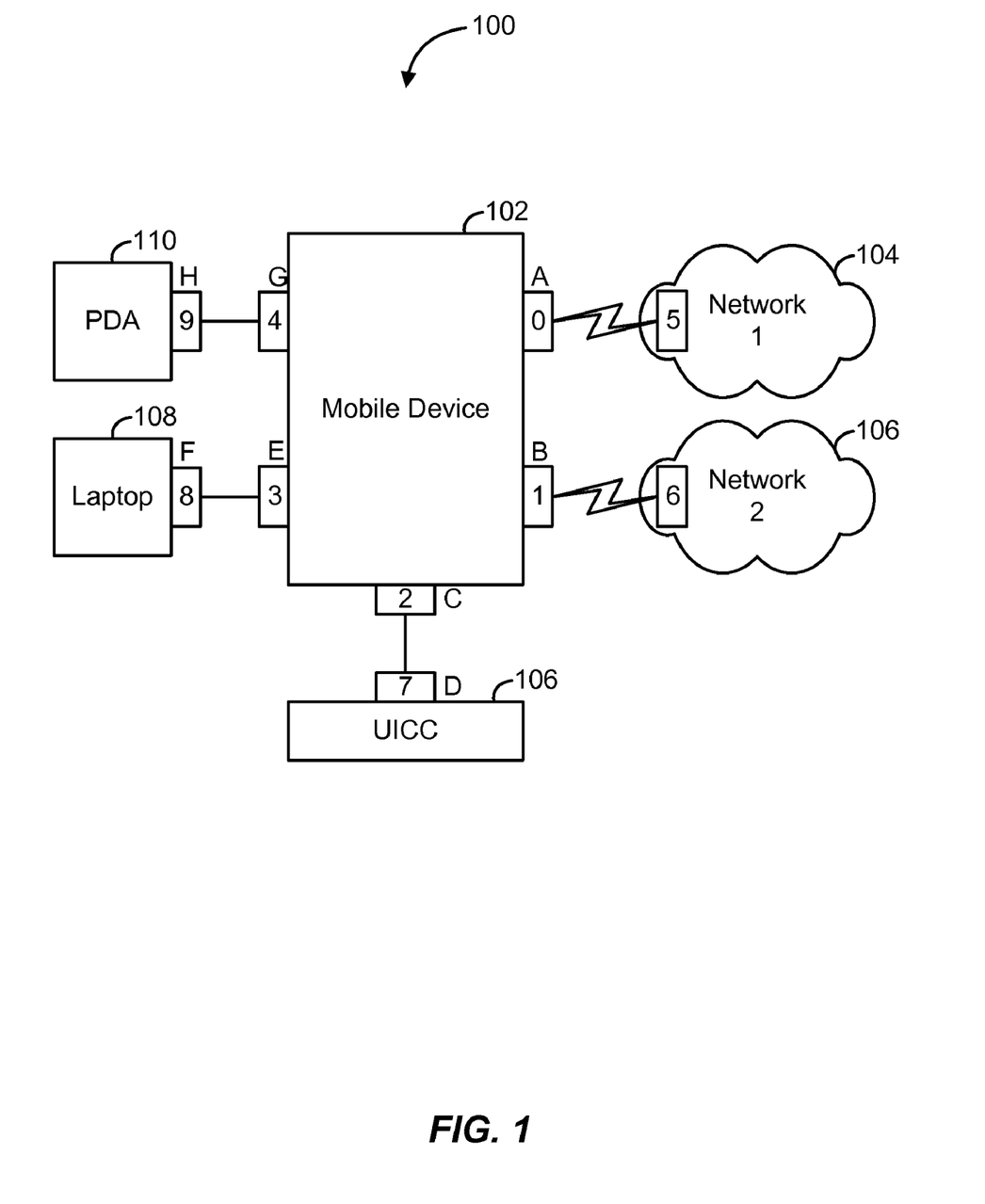
FIG. 1 is a block diagram depicting an internetworking architecture, in accordance with various aspects.

FIG. 1 depicts an internetworking architecture 100, in accordance with various disclosed aspects. A mobile device 102 may be communicatively coupled to a first network 104 and a second network 106 over a wireless or wired link. Mobile device 102 may be, for example, a mobile telephone, a personal digital assistant, or any other mobile device. Moreover, while a mobile device is described herein, it is noted that the described systems, methods, and apparatus ma also be implemented by a fixed electronic device, such as a desktop personal computer. While two networks are depicted, this configuration is merely exemplary. Mobile device 102 may be configured to communicate with any number of networks. Each of first network 104 and second network 106 may be, for example, an intranet, the Internet, a local area network, a subscriber access network (i.e., 3GPP2 networks such as cdma2000), and/or any other network.

Mobile device 102 may have connected thereto a plurality of peripheral devices. The peripheral device may be external or internal devices. For example, a first peripheral device may be UICC device 106 (e.g., a SIM card), which may be internal to the mobile device 102. Mobile device 102 may also have connected thereto a plurality of external device, such as, for example, a laptop 108 and a personal digital assistant (PDA) 110.

Mobile device 102 may include a plurality of interfaces for communicating with the plurality of peripheral devices and connecting to the networks. As depicted in FIG. 1, interface "0" provides a connection to first network 104, while interface "1" provides a connection to second network 106. Interface "2" connects to UICC device 106, interface "3" connects to laptop 108, and interface "4" connects to PDA 110. Each device also comprises an interface for communicating with the mobile device 102, as indicated by interfaces 5-9. The network interfaces may be used to connect to a router used to connect to the mobile device 102.

Each interface may have associated therewith one or more IP addresses for communicating. According to some aspects, the mobile device 102 and each peripheral device may generate a link-local IP address for communicating with all directly connected devices using stateless address auto-configuration. That is, mobile device 102 may generate a link-local IP address for communicating with each of UICC device 106, laptop 108, and PDA 110. Each of UICC device 106, laptop 108, and PDA 110 may generate a link-local IP address for communicating with the mobile device 102 and each other.

According to some aspects, the link-local IP addresses may be IPv6 addresses. As described above, IPv6 address are 128-bit addresses, wherein the lower 64 bits may represent an interface identifier (IID) and the upper 64 bits may represent a prefix. For link-local communications, the prefix may be the well-known link-local prefix 0xFE80, as specified by the stateless auto configuration specification. The IIDs may be randomly generated by each device.

According to some aspects, UICC device 106, laptop 108, and PDA 110 may be configured to connect to first network 104 and second network 106. As such, these devices also need an IP address for global communications in addition to the IP address established for link-local connectivity. According to some aspects, the mobile device 102 may be configured to establish a connection to first network 104 and/or second network 106. The selected network provides a global prefix and address for use by the mobile device when communicating with the network. The mobile device 102 may be configured to provide the global prefix to each peripheral device, and the peripheral device may generate a global address by prepending the global prefix to its self generated IID. According to exemplary aspects, mobile device 102 may be configured to negotiate addresses with first network 104 and/or second network 106 in order to avoid address conflicts.

Figure 2:
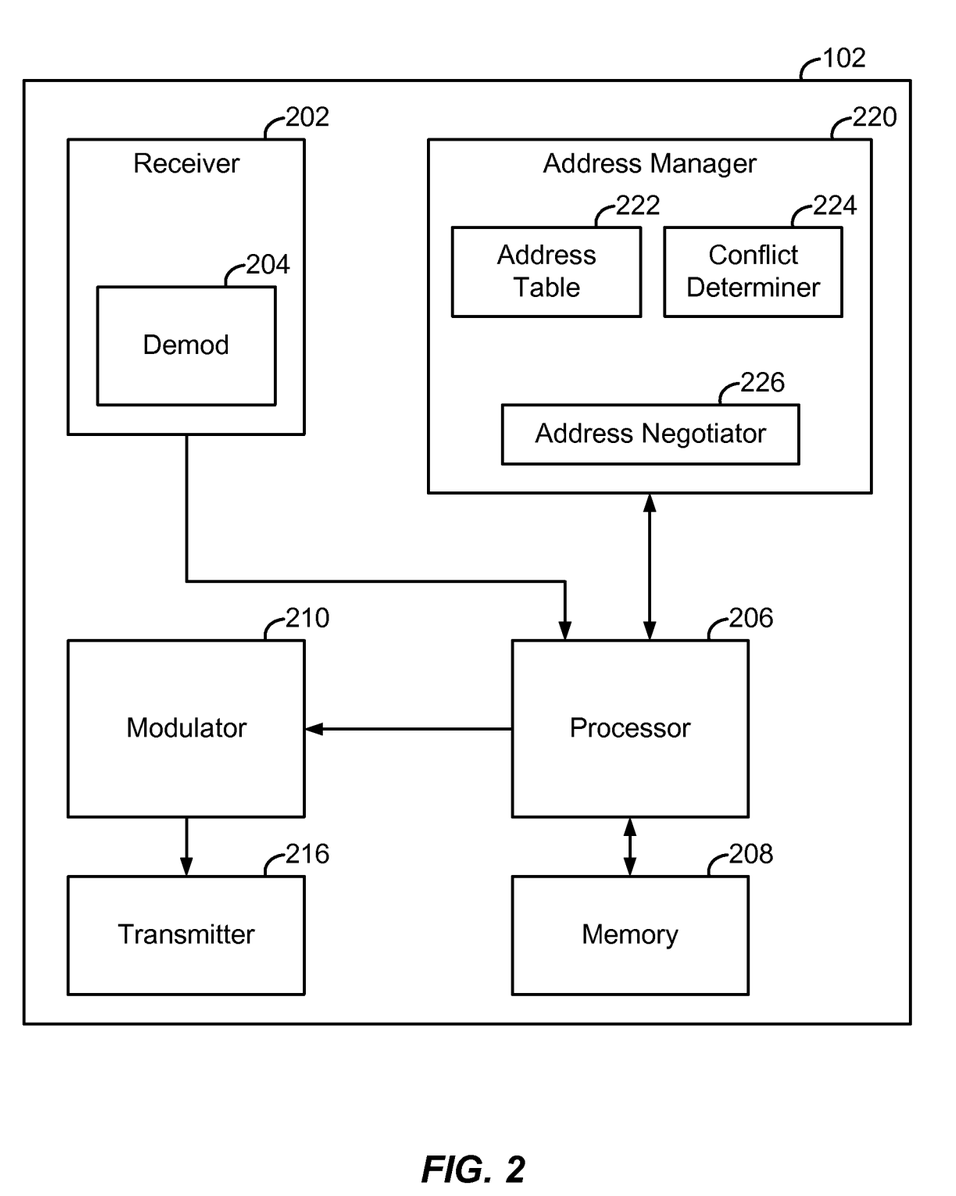
FIG. 2 is a block diagram depicting a mobile device, in accordance with various aspects.

FIG. 2 depicts mobile device 102 in greater detail. Mobile device 102 may comprise a receiver 202 that receives a signal from, for example, a receive antenna (not shown), performs typical actions (e.g., filters, amplifies, downconverts, etc.) on the received signal, and digitizes the conditioned signal to obtain samples. Mobile device 102 may also comprise a demodulator 204 that can demodulate received symbols and provide them to a processor 206. Processor 206 may be a processor dedicated to analyzing information received by receiver 202 and/or generating information for transmission by a transmitter 216 operatively coupled to a modulator 210, a processor that controls one or more components of mobile device 102, and/or a processor that both analyzes information received by receiver 202, generates information for transmission by transmitter 216, and controls one or more components of mobile device 102.

Mobile device 102 may additionally comprise memory 208 that is operatively coupled to processor 206 and that can store data to be transmitted, received data, information related to network connectivity, and/or any other suitable information. Mobile device 102 may additionally store protocols and/or algorithms associated with network connectivity or other functions performed by mobile device 102. It will be appreciated that memory 208 may be either volatile memory or nonvolatile memory, or can include both volatile and non-volatile memory. By way of illustration, and not limitation, nonvolatile memory can include read only memory (ROM), programmable ROM (PROM), electrically programmable ROM (EPROM), electrically erasable PRROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). The memory 208 is intended to comprise, without being limited to, these and any other suitable types of memory.

Processor 206 may further be operatively coupled to an address manager 220, which may be configured to negotiate with a network to prevent address conflicts. As the link-local prefix is common to all devices, the address manager 220 may be configured to ensure that the self-generated IIDs are unique, both locally and globally. Address manager 220 may maintain an address table 222 which lists the configured IIDs on each interface. Additionally, address manager 220 may include a conflict determiner 224 that compares the addresses in address table 222 with globally assigned addresses to determine whether a conflict exists. Address manager 220 may further include an address negotiator 226 that, if a conflict is detect, negotiates with the network and/or a peripheral device to configure an address which does not cause an address conflict.

Figure 3:
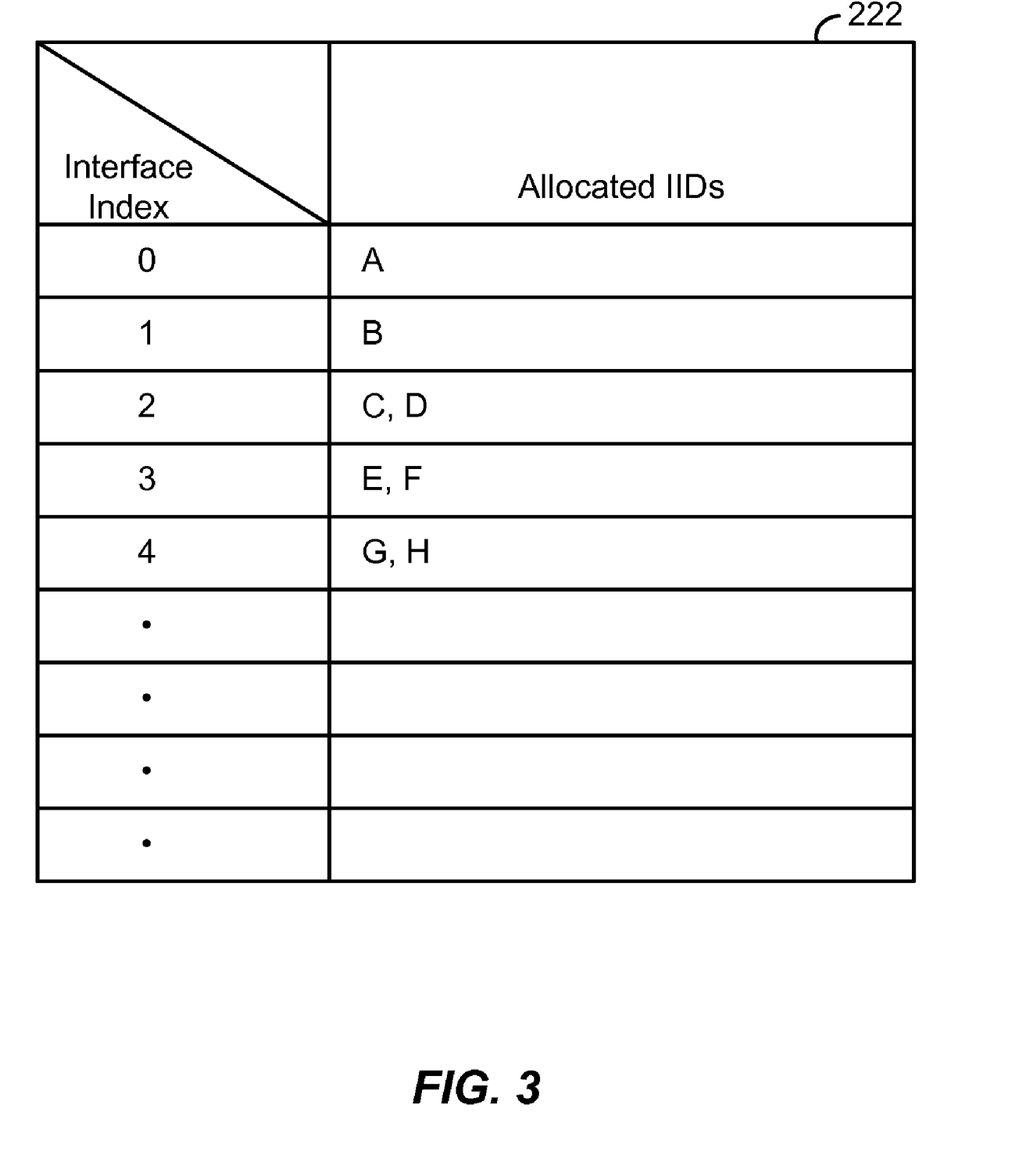
FIG. 3 depicts an exemplary address table, in accordance with various disclosed aspects.

FIG. 3 is an example of an address table 222, in accordance with some aspects. Mobile device 102 (depicted in FIG. 1) comprises five interfaces—0, 1, 2, 3, and 4. Each interface may have associated therewith one or more IIDs, and may receive communications from other devices having one or more IIDs. For example, as depicted in FIG. 1, the mobile device has configured an IID "A" for communicating with network 1, "B" for communicating with network 2, "C" for communicating locally with UICC 106, "E" for communicating locally with laptop 108, and "G" for communication locally with PDA 110. Likewise, UICC 106 has configured IID "D" for local communications, laptop 108 has configured "F", and PDA 110 has configured "H".

As depicted in FIG. 3, address table 222 may be configured to store the locally allocated IIDs for which communications are received on each of mobile device's interfaces. Thus, interface 0 is associated with IID A and interface 1 is associated with IID B. Interface 2 is associated with IIDs C and D, interface 3 with IIDs E and F, and interface 4 with IIDs G and H. While the address table 222 stores only IIDs, according to some aspects, the address table 222 may store complete IP addresses. According to some aspects, address table 222 may be of a finite size. As such, entries to the table would need to be purged as new Neighbor Advertisements (NAs) are received. Any known method of purging entries may be used. For example, a least recently used (LRU) algorithm may be used to purge those entries least used. Alternatively, the oldest entries may be purged to release space for newer entries. Other purging mechanisms may also be used.

Figure 4A:
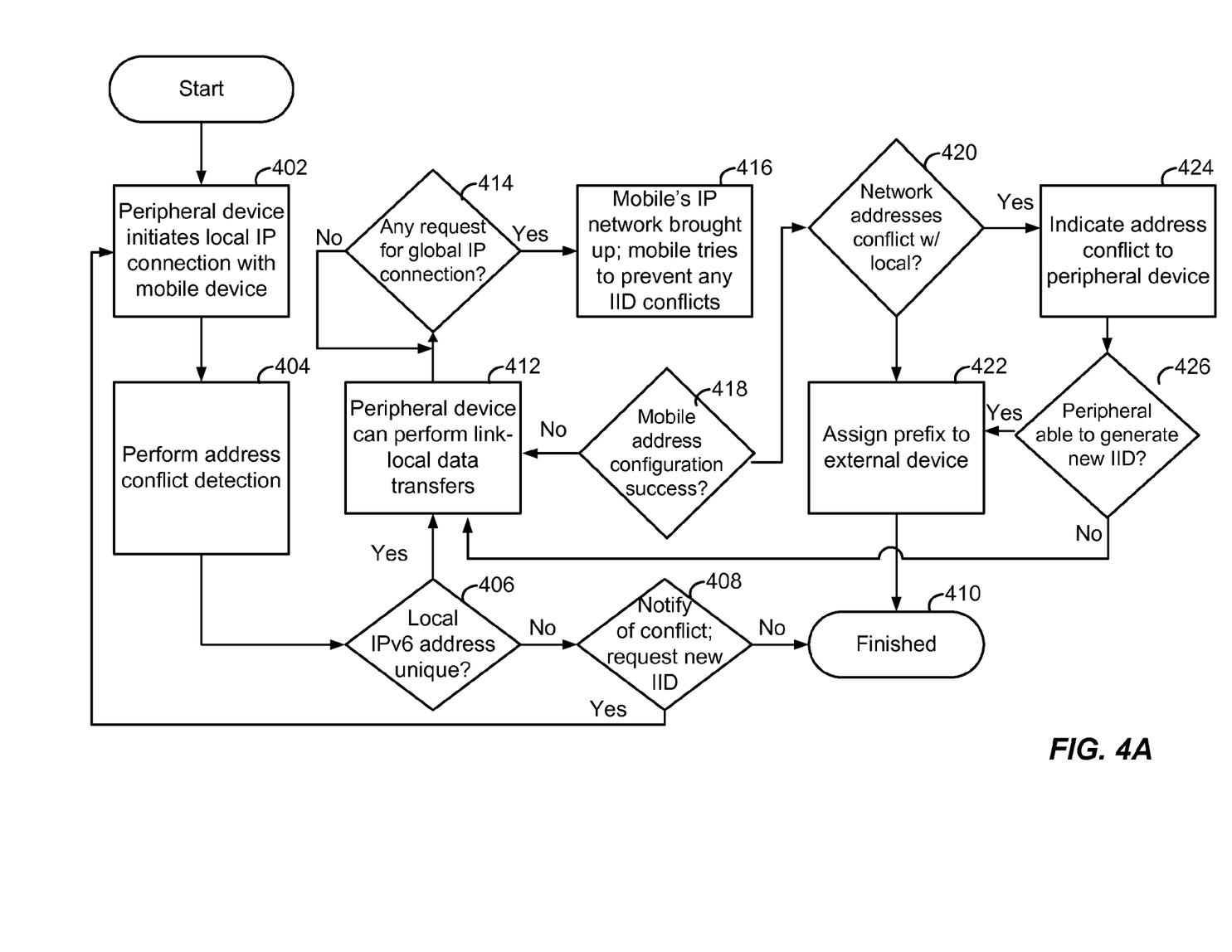
FIGS. 4A and 4B are flowcharts depicting an exemplary address management process, in accordance with various disclosed aspect.

FIG. 4A is a flowchart depicting and exemplary method of initializing global IP connectivity and avoiding conflicts, in accordance with various aspects. The method may be performed, for example, by mobile device 102 depicted in FIG. 1. As depicted at 402, peripheral devices may initiate local IP connectivity with the mobile device. Each peripheral device, such as UICC device 104, laptop 106, and PDA 108 may generate a local IPv6 address by generating an IID and prepending the link-local prefix to the generated IID. The generated IIDs may be broadcast to any device directly connected. Thus, the mobile device would receive an indication of the IID for each connected peripheral device.

As depicted at 404, the mobile device may perform address conflict detection. As each device randomly generates its own IID, it is possible that an IID conflict may occur. According to some aspects, a proxy duplicate address detection (DAD) operation may be performed to detect address conflict. Generally, in performing the proxy DAD operation, the mobile device may forward NAs on one link to all adjoining links. If a response from any link indicates a conflict, the response may be forwarded back, by the mobile device, to the original link. Duplicate address detection is described in detail in IETF RFC 2462, the entire content of which is incorporated herein by reference. According to some aspects, the mobile device may perform address conflict detection by referring to the address table 222, depicted in FIG. 3. In accordance with these aspects, proxy DAD is not necessary.

As depicted at 406, the mobile device may determine whether each local IPv6 address is unique, based on the results of the proxy DAD operation or based on the table lookup. If the addresses are not unique, the mobile device tries to notify the conflicting device to generate a new IID, as depicted at 408. This procedure is node specific as technology used at some nodes allows IID regeneration while others do not. According to some aspects, the mobile device may send an NA with the conflicting IID on behalf of another node which is using the IID to notify the conflicting device of the conflict. In other aspects, a proprietary signaling message may be used to notify the conflicting device of the conflict if the conflicting device is configured to understand the proprietary message format. If it is not possible to generate a new IID such that a conflict no longer exists, the configuration fails, as depicted at 410, and the conflicting devices are unable to communicate with the mobile device or with other locally connected peripheral devices. If IID regeneration is possible, the process returns to step 402 wherein a conflicting device re-initiates local IP connectivity with a newly generated IID.

If it is determined at step 406 that all local IPv6 addresses are unique, the peripheral devices are able to perform link-local data transfers, as depicted at 412. More particularly, the peripheral devices are able to talk to each other and to the mobile device. As depicted at 414, a determination is made as to whether any request for global IP connectivity has been made. The request may be made by the mobile device itself, or by one of the connected peripheral devices. If no request is made, the process continues to periodically check for global connectivity requests.

As depicted at 416, if a request for external IP connectivity has been made, the mobile device's IP network may be brought up, and the mobile may attempt to prevent any IID conflicts. This process is depicted in greater detail in FIG. 4B. As depicted at 416a, the mobile device brings up its external IP network connection and configures a network address. In bringing up the mobile's IP network, the network assigns to the mobile device a global prefix which forms part of the mobile device's IPv6 address. According to some aspects, the mobile device may self-generate an IID for the interface to the network, and append the generated IID to the assigned global prefix to create an IPv6 address. In other aspects, the network assigns an IID to the mobile device for use on its external interface. The mobile device may also be informed of the IID associated with the network router to which the mobile device will interface.

Figure 4B:
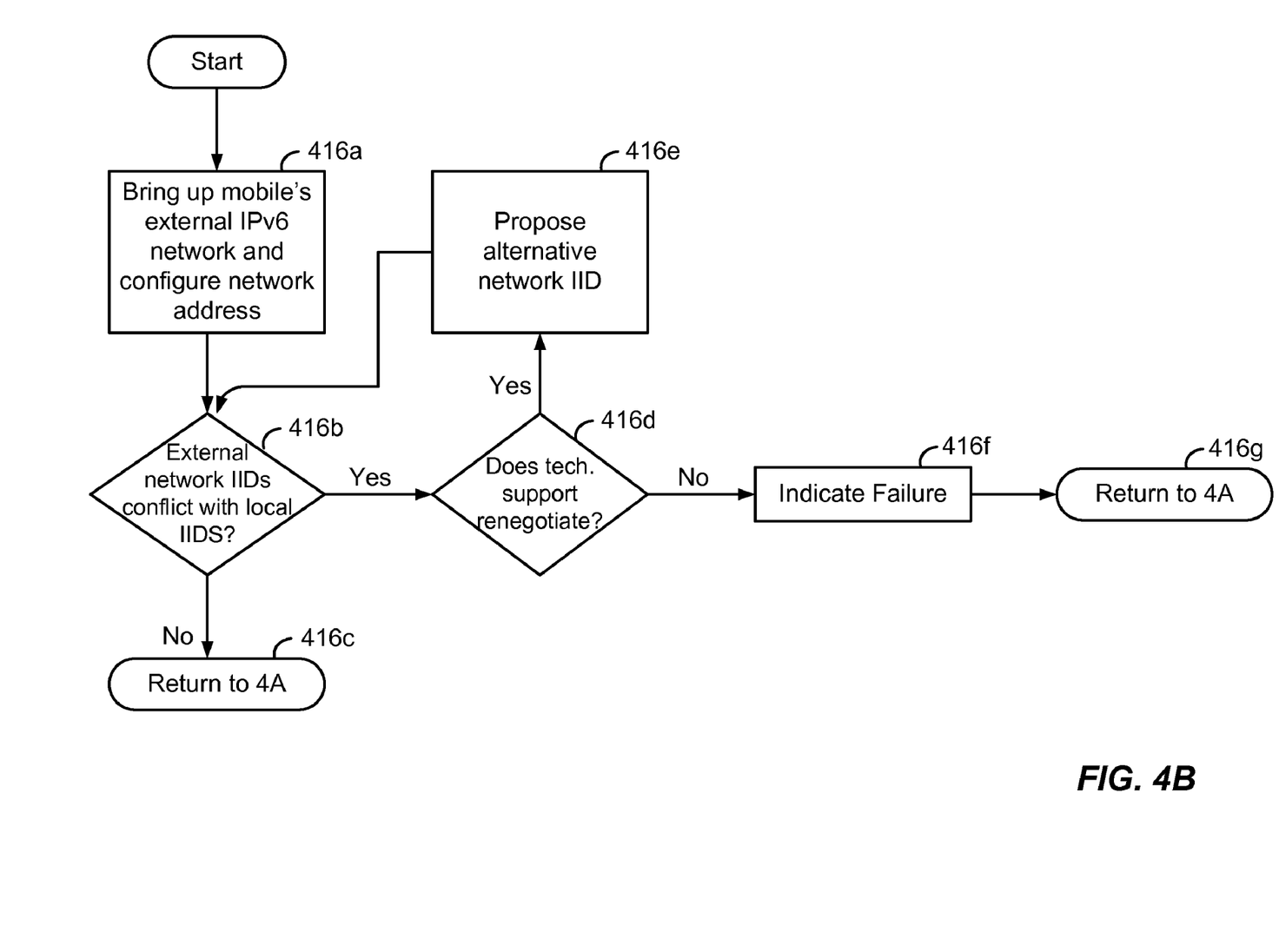

As depicted at 416b, the mobile device may determine whether any network generated IIDs conflict with any of the locally generated IIDs. This process may be performed by consulting the address list stored by the mobile device. If a conflict is not detected, as depicted at 416c, processing returns to FIG. 4A.

If an address conflict is detected, the mobile device may attempt to renegotiate the external IIDs. For example, in a 3GPP2 based network, IID configuration may occur during the negotiation procedures for PPP. Moreover, in a wireless local area network (WLAN environment), a neighbor solicitation (NS) may be received from an external entity indicating an IID the entity wishes to use. The mobile device may be configured to negotiate with the external entity on behalf of its connected peripheral devices. The process then returns to step 416b to determine whether the newly proposed IID presents a conflict. However, not all network technology types support address renegotiation. As depicted at 416d, a determination is made as to whether renegotiation is supported. If renegotiation is supported, an alternative IID may be proposed by the mobile device or by the network, as depicted at 416e This process may continue until a non-conflicting address is found. According to some aspects, a predefined number of iterations may be performed to find a non-conflicting address. If the predefined number of iterations has been met, the device may accept the network's proposed IID and continue the configuration. In other aspects, a timeout may occur if a non-conflicting address is not found. If it is determined at 416d that the network does not support renegotiation, the failure may be indicated, as depicted at 416f, and processing returns to FIG. 4A, as depicted at 416g.

Returning now to FIG. 4A, as depicted at 418, a determination is made as to whether the mobile device was able to successfully configure an external address for itself. If the mobile device was unable to successfully configure an external address, processing may return to step 412, wherein the mobile device and the peripheral devices are able to continue link local data transfers. The mobile device may be unsuccessful at configuring an address for various reasons such as, for example, a timeout for inability to find a non-conflicting address, inability to negotiate desired parameters, the device is unauthorized, a lack of network resources, and/or any other reason.

If the device is able to successfully bring up an external connection, as depicted at 420, a determination is made is to whether any network assigned IIDs remain a conflict with any of the local IIDs. If a conflict does not exist, the mobile device may assign the global prefix to the peripheral devices, as depicted at 422. The peripheral devices are now able to perform link local data transfers as well as global transfers over the network associated with the global prefix.

If a conflict is still present, the mobile device may indicate the address conflict to the affected peripheral device, as depicted at 424. According to some aspects, the mobile device may indicate the conflict by sending a NA to the affected peripheral device. In other aspects, a proprietary signaling message may be used. A determination is then made as to whether the peripheral device is able to generate a new IID, as indicated at 426. As described above, certain implementations allow the generation of a new IID. If the affected peripheral device is unable to regenerate a new IID, processing returns to step 412, wherein the affected peripheral device is able to continue link local communication. According to some aspects, the device indicates its inability to generate a new IID by sending a NA with the same conflicting IID. In other aspects, the peripheral device may simply ignore the conflict notification, indicating to the mobile device that address regeneration is not possible. If the affected peripheral device is able to regenerate a new IID which does not cause an address conflict, the mobile device may assign the global prefix to the peripheral devices, as depicted at 422. The peripheral device may send the new IID via a NA. The device is then able to communicate globally.

Figure 5:
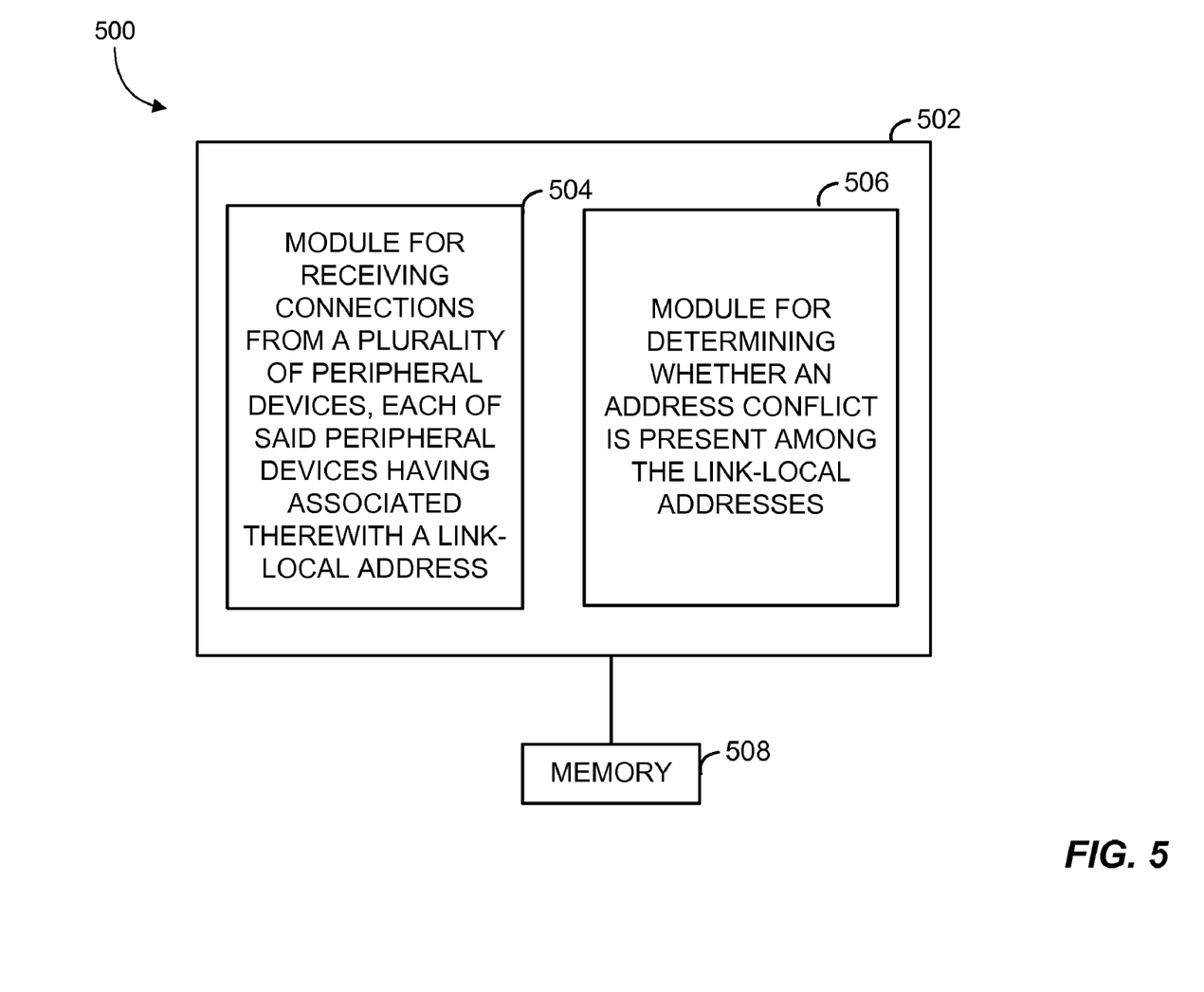
FIG. 5 is an illustration of an example methodology that facilitates address management, in accordance with some aspects.

Turning to FIG. 5, illustrated is a system 500 for ensuring network address uniqueness. As depicted, system 500 includes functional blocks that can represent functions implemented by a processor, software, or combination thereof (e.g., firmware). System 500 includes a logical grouping 502 of electrical components that act in conjunction. System 500 may be implemented, for example, by a mobile device. Logical grouping 502 can include a module for receiving connections from a plurality of peripheral devices, each of said plurality of peripheral devices having associated therewith a link-local address for communicating with the mobile device and the other locally connected peripheral devices 504. Moreover, logical grouping 502 can include a module for determining whether an address conflict is present among the link-local addresses 506. Additionally, system 500 can include a memory 508 that retains instructions for executing functions associated with electrical components 504 and 506. While shown as being external to memory 508, it is to be understood that electrical components 504 and 506 can exist within memory 508.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for ensuring network address uniqueness, comprising:

receiving, at a mobile device, connections from a plurality of peripheral devices, each of said plurality of peripheral devices having associated therewith a link-local address for communicating with the mobile device and the other locally connected peripheral devices;

determining, by the mobile device, whether an address conflict is present among the link-local addresses;

receiving, by the mobile device, a request to connect to an external network; and negotiating with the external network for a global address that does not conflict with any of the link-local addresses.

2. The method of claim 1, wherein determining whether an address conflict is present among the link-local addresses comprises:

receiving, from each of the peripheral devices, a message indicating the link-local address associated with the peripheral device;

performing a proxy duplicate address detection (DAD) operation to determine whether any conflicting link-local addresses are present.

3. The method of claim 1, wherein determining whether an address conflict is present among the link-local addresses comprises:

receiving, from each of the peripheral devices, a message indicating the link-local address associated with the peripheral device;

referring to an address table to determine whether an address conflict is present, storing the link-local address of each of the plurality of peripheral devices.

4. The method of claim 1, wherein if a conflict is found, the method further comprises:

notifying conflicting peripheral devices to generate a new link-local address;

if the conflicting peripheral devices can generate a new link-local address, determining whether the new link-local address presents a conflict; and if the conflicting peripheral devices cannot generate a new address, prohibiting the conflicting peripheral devices from performing link-local communications.

5. The method of claim 4, wherein notifying conflicting peripheral devices comprises sending a neighbor advertisement to the conflicting peripheral devices, the neighbor advertisement including the conflicting address.

6. The method of claim 4, wherein notifying conflicting peripheral devices comprises sending a proprietary signaling message to indicate the conflicting address.

7. The method of claim 4, further comprising:

receiving a neighbor advertisement from a conflicting peripheral device indicating the new link-local address if the conflicting peripheral device can generate a new link-local address.

8. The method of claim 1, wherein each link-local address is an internet protocol version 6 (IPv6) address comprising a prefix and an interface identifier (IID).

9. The method of claim 8, wherein ensuring that each of the link-local addresses are unique comprises ensuring that each IID is unique.

10. The method of claim 1, wherein negotiating with the external network for a global address which does not conflict with any of the link-local addresses comprises:

sending a request to the external network to establish a connection;

receiving a global prefix from the external network;

determining whether an address for communicating with the external network conflicts with any link-local address; and if a conflict is present, negotiating a new address for communicating with the external network.

11. The method of claim 10, wherein the address for communicating with the external network is an address of a router forming part of the external network.

12. The method of claim 10, wherein the address for communicating with the external network is an address assigned to the mobile device for communicating with the external network.

13. The method of claim 10, wherein the address for communicating with the external network is an IPv6 address comprising an IID.

14. The method of claim 10, further comprising:

providing the global prefix to each of the plurality of peripheral devices if the negotiation is successful; and notifying the peripheral device having a conflicting local-link address of a global address configuration failure if the negotiation is not successful.

15. The method of claim 14, wherein notifying the peripheral device having a conflicting local-link address of a global address configuration failure if the negotiation is not successful comprises:

notifying the peripheral device having the conflicting local-link address to generate a new link-local address;

allowing the peripheral device having the conflicting local-link address to communicate with the mobile device and any other of the peripheral devices if a new link-local address cannot be generated; and providing the global prefix to peripheral device having the conflicting local-link address if a new, non-conflicting link-local address can be generated.

16. At least one processor configured to ensure IP address uniqueness in a wireless network, comprising:

a first module for receiving, at a mobile device, connections from a plurality of peripheral devices, each of said plurality of peripheral devices having associated therewith a link-local address for communicating with the mobile device and the other locally connected peripheral devices;

a second module for determining, by the mobile device, whether an address conflict is present among the link-local addresses;

a third module for receiving, by the mobile device, a request to connect to an external network; and a fourth module for negotiating with the external network for a global address that does not conflict with any of the link-local addresses.

17. A computer program product, comprising:

a computer-readable medium comprising:

a first set of codes for causing a computer to receive connections from a plurality of peripheral devices, each of said plurality of peripheral devices having associated therewith a link-local address for communicating with a mobile device and the other locally connected peripheral devices;

a second set of codes for causing the computer to determine whether an address conflict is present among the link-local addresses;

a third set of codes for causing the computer to receive a request to connect to an external network; and a fourth set of codes for causing the computer to negotiate with the external network for a global address that does not conflict with any of the link-local addresses.

18. An apparatus, comprising:
at least one first interface for interfacing with at least one external network;
a plurality of second interfaces having connected thereto a plurality of peripheral devices, each peripheral device having associated therewith a link-local address for communicating with the apparatus and the other locally connected peripheral devices;
a conflict determiner for determining whether an address conflict is present among the link-local addresses;
a processor for processing a request to connect to an external network; and
an address negotiator for negotiating with the external network for a global address that does not conflict with any of the link-local addresses.

19. The apparatus of claim 18, wherein the conflict determiner is further configured to receive, from each of the peripheral devices, a message indicating the link local address associated with the peripheral device and to perform a proxy duplicate address detection (DAD) operation to determine whether any conflicting link-local addresses are present.

20. The apparatus of claim 18, wherein the conflict determiner is further configured to refer to an address table to determine whether an address conflict is present, the address table storing the address for each of the plurality of peripheral devices.

21. The apparatus of claim 18 wherein if an address conflict is detected, the conflict determiner is further configured to notify the conflicting peripheral devices to generate a new link-local address, determine whether the new link-local address presents a conflict if the peripheral device can generate a new link-local address, and prohibit the peripheral device having a conflicting link-local address from performing link-local communications if the conflicting device cannot generate a new link-local address.

22. The apparatus of claim 21, wherein the conflict determiner is configured to notify the conflicting peripheral devices by sending a neighbor advertisement to the conflicting peripheral device indicating the conflicting address.

23. The apparatus of claim 21, wherein the conflict determiner is configured to notify the conflicting peripheral devices by sending a proprietary signaling message indicating the conflict.

24. The apparatus of claim 21, wherein the conflict determiner is configured to receive a neighbor advertisement from the conflicting peripheral device indicating the new link-local address if the conflicting device can generate a new link-local address.

25. The apparatus of claim 18, wherein each of the link-local addresses is an IPv6 address comprising a prefix and an interface identifier (IID).

26. The apparatus of claim 25, wherein the conflict determiner is further configured to ensure that each IID is unique.

27. The apparatus of claim 18, wherein
the conflict determiner is further configured to establish a connection to the external network, receive a global prefix from the external network, and determine whether an address for communicating with the external network conflicts with any link-local address, and
wherein the address negotiator is further configured to negotiate a new address for communicating with the external network if a conflict is determined.

28. The apparatus of claim 27, wherein the address for communicating with the external network is an address of a router forming part of the external network.

29. The apparatus of claim 27, wherein the address for communicating with the external network is an address assigned to the mobile device for communicating with the external network.

30. The apparatus of claim 27, wherein the address for communicating with the external network is an IPv6 address comprising an IID.

31. The apparatus of claim 27, wherein the address negotiator is further configured to provide the global prefix to each of the plurality of peripheral devices if the negotiation is successful, and to notify the peripheral device having a conflicting local-link address of a global address configuration failure if the negotiation is not successful.

32. The apparatus of claim 31, wherein the address negotiator is further configured to notify the peripheral device having the conflicting local-link address to generate a new link-local address, to allow the peripheral device having the conflicting local-link address to communicate with the mobile device and any other of the peripheral devices if a new link-local address cannot be generated, and to provide the global prefix to peripheral device having the conflicting local-link address if a new, non-conflicting link-local address can be generated.

* * * * *